3,264,109
PHOTOGRAPHIC MATERIALS FOR THE SILVER
DYESTUFF BLEACHING PROCESS
Walter Anderau, Aesch, Basel-Land, Switzerland, assignor to Ciba Limited, Basel, Switzerland, a Swiss company
No Drawing. Filed Oct. 25, 1962, Ser. No. 233,154
Claims priority, application Switzerland, Nov. 2, 1961, 12,705/61
5 Claims. (Cl. 96—99)

In photographic reproduction processes, yellow dyestuffs for gelatine layers are used not only as ground colors in the composition of the layers, but also as filter dyestuffs. The dyestuffs used in the silver dyestuff bleaching process must possess a wide range of properties. In general, but especially in the case of images viewed in incident light, a good fastness to light is required as well a good bleachability in the silver dyestuff bleaching bath. It is of advantage if the solubility in water is good so as to facilitate preparation of the layers, but, on the other hand, a high degree of diffusion resistance is required. If the yellow dyestuff is used as an image dyestuff, it should absorb light in the wavelength range of 400 to to 480 m$\mu$, and should be highly transparent in the remaining spectrum range.

A yellow dyestuff can only be used as a filter dyestuff in the silver dyestuff bleaching process if the filter layer contains sufficient preexposed silver bromide to ensure that the yellow in the dyestuff bleaching bath is completely bleached out. The absorption range for such filter dyestuffs can be 400 to 500 m$\mu$, or even up to 520 m$\mu$.

This invention is based on the observation that these requirements are especially well met by a group of yellow dyestuffs exemplified by the dyestuff of the formula (1)

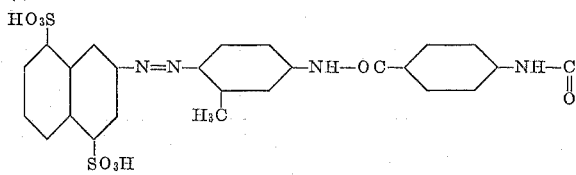

The present invention thus provides photographic materials for the silver dyestuff bleaching process that contain on a support a layer having at least one dyestuff of the formula (2) R$_1$—N=N—R$_2$—NH—OC—R$_3$—NH—X—
    HN—R$_3$—CO—HN—R$_2$—N=N—R$_1$ in which R$_1$ represents a benzene radical or a naphthalene radical that contains at least two sulfonic acid groups, R$_2$ represents a benzene radical bound to the —N=N— and —NH— groups in para-position, R$_3$ represents a benzene radical bound to the —OC— and —NH— groups in meta- or para-position, and X represents the radical of a dibasic acid that contains carbon.

The dyestuffs of the Formula 2 can be prepared in the known manner linking two molecules of an aminoazo dyestuff of the formula (3)    R$_1$—N=N—R$_2$=NH—OC—R$_3$—NH$_2$ in which R$_1$, R$_2$ and R$_3$ have the meanings given above, by means of halides, especially the chlorides, of dibasic acids that contain carbon. The aminoazo dyestuffs of the Formula 3 are obtained when a diazo compound of an aminobenzene disulfonic acid or an aminonaphthalene disulfonic acid (R$_1$—NH$_2$) is coupled with an aminobenzene (H—R$_2$—NH$_2$) capable of coupling in para-position to the amino group, the resulting dyestuff is acylated with a nitrobenzoyl chloride and the nitro group is reduced to an amino group.

The aminobenzene sulfonic acids or aminonaphthalene sulfonic acids serving as diazo components contain at least two sulfonic acid groups and advantageously no other substituents or, at most a methyl group. The radical R$_1$ in such disulfonic acids corresponds, for example, to the formula —(C$_{4p+2}$H$_{2p+1}$)(—SO$_3$H)$_2$, in which $p$ represents an integer not greater than 2, that is to say, 1 or 2. Aminonaphthalene disulfonic acids are preferably used. As examples of diazo components there may be mentioned:

1-aminobenzene-2:4-disulfonic acid,
1-aminobenzene-2:5-disulfonic acid,
1-amino-2-methyl-3:5-disulfonic acid,
1-aminonaphthalene-3:6-disulfonic acid, and
1-aminonaphthalene-3:6:8-trisulfonic acid.

The dyestuffs of the Formula 2 in which the radical R$_1$ represent the radical of 2-aminonaphthalene-4:8-disulfonic acid have proved to be especially valuable.

In addition to the amino group, the coupling components of the formula H—R$_2$—NH$_2$ used in the preparation of the aminoazo dyestuffs of the Formula 3 may also advantageously contain one or two alkyl and/or alkoxy groups containing one or two carbon atoms. There may be mentioned, for example, aminobenzene, 1-amino-2- or advantageously -3-methylbenezene, 1-amino-2- or -3-methoxybenzene, 1-amino-2- or -3-ethylbenzene, 1-amino-2:5- or -3:5 - dimethylbenzene, 1 - amino-2-methoxy-5-methylbenzene, and 1-amino-2:5-dimethoxybenzene.

For acylation of the aminoazo dyestuffs of the formula R$_1$—N=N—R$_2$—NH$_2$ so obtained there is used, for example, meta-nitrobenzoyl chloride or advantageously a para-nitrobenzoylchloride, such as 3-methyl-4-nitrobenzoyl

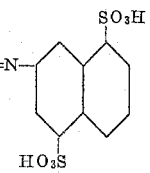

chloride or preferably 4-nitrobenzoyl chloride which is not further substituted.

From the nitroazo dyestuffs so prepared the aminoazo dyestuffs of the Formula 3 are obtained by reduction, and these are then reacted with halides or dibasic acids that contain carbon. For this purpose there are used, for example, the dihalides of aromatic, heterocyclic or aliphatic dicarboxylic acids. The dihalides of cyclic dicarboxylic acids advantageously contain only a single ring. As examples there may be mentioned the dichlorides of the following acids:

Fumaric acid,
Butadiene dicarboxylic acid-(1:4),
Isophthalic acid,
Terephthalic acid,
Pyridine-2:4, -2:5-, -2:6- or 3:5-dicarboxylic acid,
Pyrrol-2:5-dicarboxylic acid,
Furane-2:5-dicarboxylic acid, and
Thiophene-2:5-dicarboxylic acid.

Compounds that have proved especially valuable are the urea derivatives of the Formula 2, in which —X— represents a —CO— group, obtained from the aminoazo dyestuffs of the Formula 3 by reaction with phosgene, i.e. the dichloride of carbonic acid.

The preparation of the aminoazo dyestuff of the Formula 3 from the aforesaid starting materials by azocoupling, acylation, and reduction of the nitro groups and the linking of the amino groups by means of dicarboxylic acid dichlorides to form the dicarboxylic acid diamides, or by means of phosgene to form the urea of the Formula 2 can be carried out in known manner.

Likewise, the photographic layers that in accordance with the invention contain at least one dyestuff of the Formula 2, can also be prepared in known manner and used for the production of colored images.

In particular, the dyestuffs of the Formula 2 can be present in multi-layer material that, on a layer support, contains a selectively red-sensitized silver bromide emulsion colored with a green-blue dyestuff, and above that, a selectively green-sensitized silver bromide emulsion colored with a magenta dyestuff and, finally, above that, a selective blue-sensitized layer colored yellow with a dyestuff of the Formula 2.

A special advantage of the dyestuffs of the Formula 2 is that they are highly resistant to acidic oxidation baths, for example, a bath that contains 5 g. of potassium bichromate and 5 cc. of concentrated sulfuric acid per liter of water, which is necessary when, in the course of the developing process, a silver dissolving bath is required for the layers (reversal process).

Unless otherwise stated, the parts and percentages in the following examples are by weight:

*Example 1*

4 grams of the dyestuff of the Formula 1 are dissolved in 800 cc. of water, and 12 cc. of a saponin solution of 8% strength added to the solution so obtained. The whole is then added to 1 kg. of a silver bromide gelatine emulsion containing 30 to 35 g. silver in the form of silver bromide. The mixture is then homogenized, de-aerated and cast on a suitable support, for example, a cellulose acetate film. After drying, the layer is exposed through a yellow separation image and then processed as follows:

(1) Development of the silver image for 8 minutes at 20° C. in a bath containing, per 1000 cc. of water, 0.75 g. of N-methyl-paraaminophenol, 3 g. of hydroquinone, 25 g. of sodium sulfite, 40 g. of sodium carbonate and 1 g. of potassium bromide.

(2) Washing in water for 3 minutes.

(3) Fixation for 5 minutes in a solution of 200 g. of sodium thiosulfate and 20 g. of potassium metabisulfite in 1 liter water.

(4) Washing in water for 5 minutes.

(5) Hardening for 5 minutes in an aqueous formaldehyde solution of 4% strength.

(6) Washing in water for 5 minutes.

(7) Bleaching of the color image for 10 to 20 minutes with a solution containing, per liter of water, 60 to 100 g. of potassium bromide, 40 to 75 g. of thiourea, 35 to 80 g. of hydrochloric acid of 30% strength and 0.001 g. of aminohydroxyphenazine.

(8) Washing in water for 10 minutes.

(9) Bleaching the residual silver for 10 minutes with a solution containing, per liter of water, 60 g. of copper sulfate, 80 g. of potassium bromide and 15 g. of hydrochloride acid of 30% strength.

(10) Washing in water for 5 minutes.

(11) Fixation for 5 minutes as described under 3.

(12) Washing in water for 10 minutes.

After drying, there is obtained a yellow component image. This yellow image layer can also be one of the three layers of a multi-colored material that contains as other image-forming layers that can be bleached a cyan layer sensitized to red and a magenta layer sensitized to green in the usual order.

The dyestuffs in the yellow layers so prepared and developed are distinguished by a high fastness to light, and the colorless bleached layer areas are distinguished by great purity and no yellowing is to be observed on prolonged exposure.

Instead of the dyestuff of the Formula 1 there can also be used the yellow dyestuffs obtained form the intermediate products given in the following table, when the aminomonoazo dyestuff obtained from a diazo component listed in Column I and a coupling component listed in Column II is acylated with an acid chloride listed in Column III, the nitro group reduced to form an amino group, and two molecular proportions of the aminoacylaminoazo dyestuff are linked through the amino groups with the aid of an acid dichloride listed in Column IV.

TABLE

| No. | I. Diazo component | II. Coupling component | III. Acylating agent containing nitro group | IV. Acylating agent for linkage |
|---|---|---|---|---|
| 1 | 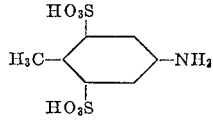 | 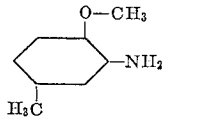 | 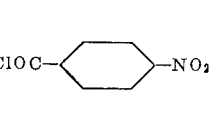 | 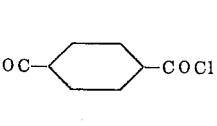 |
| 2 | 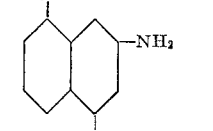 | 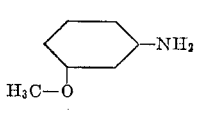 | 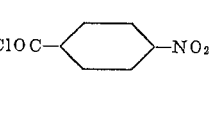 | 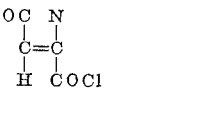 |
| 3 | 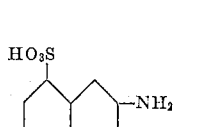 | 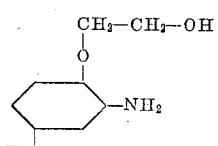 | 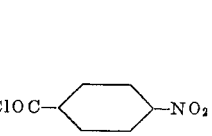 | 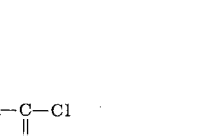 |
| 4 | 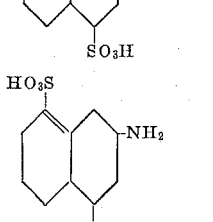 | 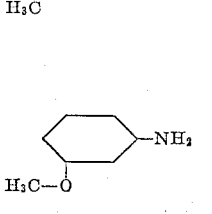 | 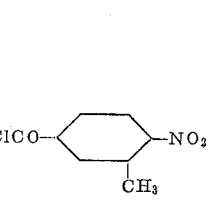 | 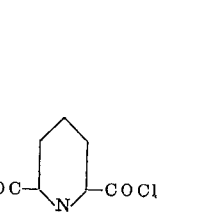 |

TABLE—Continued

| No. | I. Diazo component | II. Coupling component | III. Acylating agent containing nitro group | IV. Acylating agent for linkage |
|---|---|---|---|---|
| 5 | 1-amino-naphthalene with HO$_3$S, SO$_3$H, NH$_2$ substituents | 2-methoxy-4-methyl-aniline (O-CH$_3$, NH$_2$, H$_3$C) | ClOC-C$_6$H$_4$-NO$_2$ | ClOC-C$_6$H$_4$-COCl |
| 6 | naphthalene with HO$_3$S, NH$_2$, HO$_3$S, SO$_3$H | 2-methoxy-4-methyl-aniline | ClOC-C$_6$H$_4$-NO$_2$ | ClOC-C$_6$H$_4$-COCl |
| 7 | benzene with SO$_3$H, NH$_2$, HO$_3$S | 2-methoxy-4-methyl-aniline | ClOC-C$_6$H$_4$-NO$_2$ | Cl-CO-Cl |
| 8 | naphthalene with NH$_2$, HO$_3$S, SO$_3$H | 2-methoxy-4-methyl-aniline | ClOC-C$_6$H$_4$-NO$_2$ | Cl-CO-Cl |
| 9 | naphthalene with NH$_2$, HO$_3$S, SO$_3$H | 3-methoxy-aniline (H$_3$C-O, NH$_2$) | ClOC-C$_6$H$_4$-NO$_2$ | Cl-CO-Cl |
| 10 | naphthalene with NH$_2$, HO$_3$S, SO$_3$H | 3-methyl-aniline (H$_3$C, NH$_2$) | ClOC-C$_6$H$_4$-NO$_2$ | Cl-CO-Cl |
| 11 | naphthalene with HO$_3$S, NH$_2$, SO$_3$H | 3-methoxy-aniline | ClOC-C$_6$H$_4$-NO$_2$ | Cl-CO-Cl |

As has already been stated, the dyestuffs of the Formula 2 can, in general, be prepared by the known methods given above. For the sake of completeness a detailed manufacturing prescription for the dyestuff of the Formula 1 is appended: 61 parts of the sodium salt of 2-amino-naphthalene-4:8-disulfonic acid are dissolved in 1200 parts of water and the solution cooled to 0° C. with ice. The solution is acidified with 65 parts of concentrated hydrochloric acid, and 50 parts of an aqueous solution of 14 parts of sodium nitrite are added in the course of 10 minutes. The diazotization is complete after a short period, whereupon there are added 24 parts of 1-amino-3-methylbenzene which have been dissolved in 200 parts of water containing 30 parts of concentrated hydrochloric acid. After 10 minutes there are added 30 parts of crystallized sodium acetate in portions, and the whole is stirred for 24 hours at 8 to 15° C. The reaction mixture is then heated to 70° C., 500 parts of concentrated hydrochloric acid are added, and the mixture is then allowed to cool to 20° C. The dyestuff precipitates in the form of a violet black powder. The dyestuff is filtered off and dissolved in 2000 parts of water having a temperature of 85° C., and sodium carbonate is added until a slightly alkaline reaction is obtained. 33 parts of anhydrous sodium acetate are then added followed by 38 parts of finely powdered 4-nitro-benzoyl chloride. The whole is then stirred for 2 hours at 85° C. and then 15 to 20 parts of anhydrous sodium carbonate and 300 parts of sodium chloride are added; the nitrobenzoylated dyestuff precipitates and is isolated by filtration. The dyestuff so obtained is suspended in 2000 parts of water having a temperature of 40° C., and to the suspension are added 26 parts of sodium sulfide (100%) in the form of an aqueous solution, and the whole is stirred for 2 hours at 40 to 42° C. The dyestuff is precipitated with 250 parts of sodium chloride and then filtered off at 20° C. The dyestuff is again dissolved in 3000 parts of water having a temperature of 40° C. and to the solution so obtained are added 80 parts of sodium borate. Phosgene is then introduced slowly at 40 to 45° C. until a Congo acid reaction is obtained. The solution is then neutralized with about 20 parts of sodium hydroxide solution of 40% strength, 300 parts of sodium chloride are added, and the whole is filtered at 25° C. The dyestuff so obtained may, if necessary, be redissolved and precipitated as free from salt as possible and then dried.

Example 2

4 grams of the dyestuff of the formula

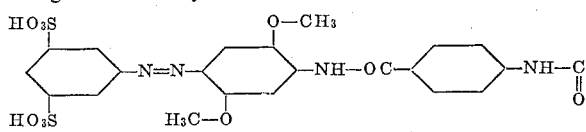

are dissolved in 600 cc. of hot water, and the solution so obtained is added, at 45° C., to 1 kg. of a silver halide emulsion containing 15 to 35 g. silver, if desired, in the form of a pre-exposed silver halide. This mixture can be used as a yellow filter layer.

If this filter layer contains pre-exposed silver halide, the silver halide is reduced to silver in the developing bath (No. 1 of Example 1), and the filter yellow is bleached in a subsequent silver dyestuff bleaching bath (No. 7 of Example 1).

In material to be used for the reversal process, the silver halide in the yellow filter layer must not be pre-exposed since it is exposed during the second exposure of the material.

Example 3

4 grams of the dyestuff of the Formula 1 are dissolved in 800 cc. of water, and the solution so obtained is added to 1 kg. of a silver bromide gelatine emulsion. After the layer, which can also form a component image of a three-layer material, has been cast and dried it is exposed under a color negative, the yellow component image of which determines the yellow image formed within the positive material.

This yellow component image is then developed with a developing solution, the composition of which is given in No. 1 of Example 1, and is then washed with water. The resulting image silver is removed in the form of silver sulfate by means of a bath that contains 5 cc. of concentrated sulfuric acid and 5 g. of potassium bichromate per liter of water. It can thus no longer have a reducing action in the subsequent silver dyestuff bleaching process. The layer is then washed with water and subjected to total exposure in a strong white light. All the residual silver halide is exposed and bleached in a developing process and a subsequent silver dyestuff bleaching process as described in Example 1, Nos. 1 to 12. A positive yellow component image is obtained.

What is claimed is:

1. Photographic material suitable for use in the silver dyestuff bleaching process, which contains on a support a gelatine silver halide layer containing at least one dyestuff of the formula $$R_1-N=N-R_2-NH-OC-\underset{H\ W}{\underset{|}{\bigcirc}}\underset{W\ H}{\overset{NH-X-HN}{\underset{|}{\bigcirc}}}-CO-HN-R_2-N=N-R_1$$

in which $R_1$ represents a member selected from the group consisting of the radicals of the formulae

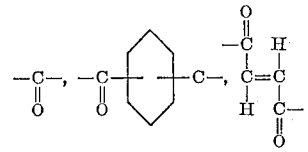

and

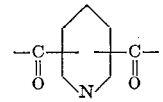

$R_2$ represents a benzene radical bound to the —N=N— group and —NH— group in para-position, W represents a member selected from the group consisting of a hydrogen atom and a methyl group and X represents a member selected from the group consisting of the radicals of the formulae $$-\overset{O}{\underset{\|}{C}}-,\ -\overset{O}{\underset{\|}{C}}-\bigcirc-\overset{O}{\underset{\|}{C}}-,\ \overset{H}{\underset{H}{\overset{C=C}{\underset{C-}{|}}}}\overset{}{\underset{\|}{\underset{O}{}}}$$

and

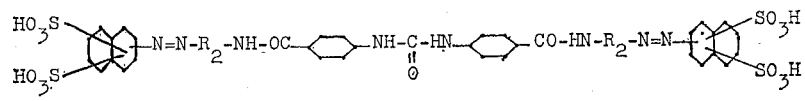

2. Photographic material suitable for use in the silver dyestuff bleaching process, which contains on a support a gelatine-silver halide layer containing at least one dyestuff of the formula

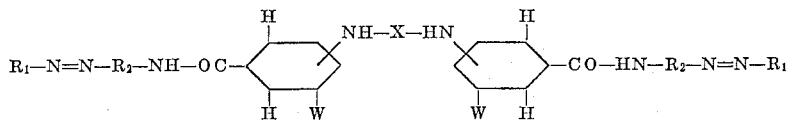

in which $R_2$ represents a benzene radical bound to the —N=N— and —NH— groups in para-position.

3. Photographic material suitable for use in the silver dyestuff bleaching process, which contains on a support a gelatine-silver halide layer containing the dyestuff of the formula

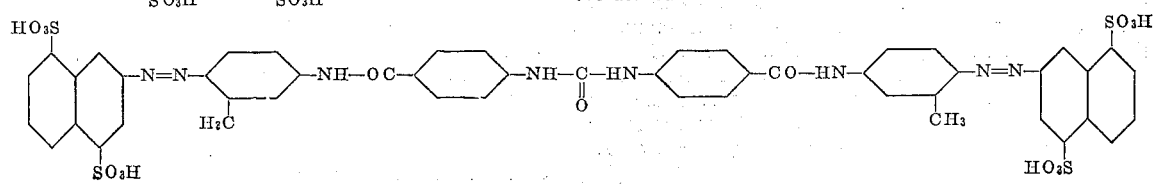

4. Photographic material suitable for use in the silver dyestuff bleaching process, which contains on a support a gelatine-silver halide layer containing the dyestuff of the formula

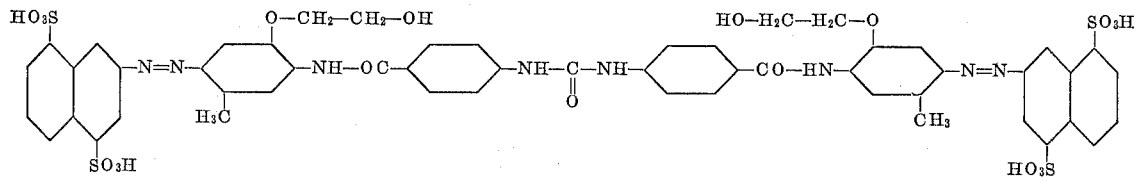

5. Photographic material suitable for use in the silver dyestuff bleaching process, which contains on a support a gelatine-silver halide layer containing the dyestuff of the formula

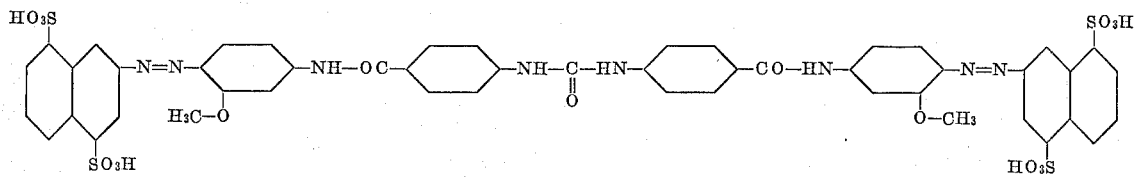

References Cited by the Examiner

UNITED STATES PATENTS

| | | | |
|---|---|---|---|
| 1,750,067 | 5/1930 | Stusser | 260—175 |
| 2,294,892 | 9/1942 | Carroll et al. | 96—99 |
| 2,304,884 | 12/1942 | Carroll | 96—99 |
| 2,341,791 | 2/1944 | Kaiser | 260—175 |
| 2,418,624 | 4/1947 | Chechak et al. | 96—99 |

FOREIGN PATENTS 841,300   7/1960   Great Britain.

OTHER REFERENCES

Cornwell-Clyne: "Colour Cineamatography," page 420, Chapman and Hall, Ltd., 37 Essex Street, London (1951).

NORMAN G. TORCHIN, *Primary Examiner.*

J. T. BROWN, *Assistant Examiner.*